United States Patent
Pray

(10) Patent No.: US 8,220,197 B1
(45) Date of Patent: Jul. 17, 2012

(54) COLLAPSIBLE FLY TRAP

(76) Inventor: Thomas J. Pray, Eliot, ME (US)

( * ) Notice: Subject to any disclaimer, the term of this patent is extended or adjusted under 35 U.S.C. 154(b) by 273 days.

(21) Appl. No.: 12/386,697

(22) Filed: Apr. 22, 2009

Related U.S. Application Data

(60) Provisional application No. 61/047,096, filed on Apr. 22, 2008.

(51) Int. Cl.
*A01M 1/10* (2006.01)

(52) U.S. Cl. ............ 43/122; 135/90; 135/95; 135/159; 43/107

(58) Field of Classification Search ............ 43/107, 43/122; 135/90, 95, 901, 143–144, 147, 135/158–159; *A01M 1/00, 1/02, 1/10*
See application file for complete search history.

(56) References Cited

U.S. PATENT DOCUMENTS

| | | | |
|---|---|---|---|
| 645,880 A | 3/1900 | Varnum | |
| 1,091,717 A | 3/1914 | Terhune | |
| 3,807,081 A * | 4/1974 | Chapiewsky | 43/118 |
| 4,285,354 A * | 8/1981 | Beavers | 135/135 |
| 5,363,589 A * | 11/1994 | Flynn | 43/122 |
| 5,419,076 A | 5/1995 | Moreland et al. | |
| 5,526,604 A * | 6/1996 | Sutherst et al. | 43/107 |
| 6,089,247 A * | 7/2000 | Price | 135/145 |
| 6,543,180 B2 * | 4/2003 | Pace | 43/107 |
| 6,604,317 B1 | 8/2003 | Newman | |
| 7,150,125 B1 | 12/2006 | Mizell, III | |
| 2003/0024562 A1 * | 2/2003 | Liu | 135/130 |
| 2005/0144831 A1 * | 7/2005 | Knauf et al. | 43/107 |
| 2005/0241688 A1 * | 11/2005 | Wu | 135/145 |
| 2007/0094915 A1 * | 5/2007 | Plato et al. | 43/114 |
| 2008/0072474 A1 * | 3/2008 | Chen | 43/122 |
| 2010/0252083 A1 * | 10/2010 | Ogle | 135/90 |

* cited by examiner

*Primary Examiner* — Darren W Ark
*Assistant Examiner* — Kathleen Iwasaki
(74) *Attorney, Agent, or Firm* — Montgomery Patent & Design, LLC; Robert C. Montgomery; Joseph T. Yaksich

(57) ABSTRACT

A chemical free trap that catches biting flies and other insects is herein disclosed. Features of the present trap include a dark-colored baitless lure which attracts biting flies, a collapsible housing that includes a fabric cover and an entrapment and containment space, a weather-resistant construction enabling the trap to be used in outdoor areas or structures, and a means for easy insect removal.

11 Claims, 6 Drawing Sheets

COLLAPSIBLE FLY TRAP

RELATED APPLICATIONS

The present invention was first described in and claims the benefit of U.S. Provisional Application No. 61/047,096, filed Apr. 22, 2008, the entire disclosures of which are incorporated herein by reference.

FIELD OF THE INVENTION

The present invention relates generally to insect traps and, more particularly, to said insect traps for attracting and capturing large numbers of flying insects such as flies and like.

BACKGROUND OF THE INVENTION

Insects are one (1) of the most common and persistent annoyances associated with any outdoor activity, especially biting insects such as horse flies. Additionally, commercial loss to livestock and crops due to insect damage and the spread of disease through blood-feeding insect bites is in the multi-millions of dollars per year in the United States. Large insect populations in outdoor areas can be attributed in part to areas of open standing water, dried grass, and the like. In cultivated fields, the insect population can be even higher due to the presence of livestock feed, bails of hay, and the like which can provide an ideal breeding ground for many types of insect life.

Attempts to collect and destroy insects have provided various alternatives. One (1) attempt to control insect populations is the use of insecticides. Disadvantageously, insecticides are harmful to the environment, expensive, and can ultimately lead to insect populations which are resistant to the chemicals used. Other alternatives include insect collecting and trapping devices which can control large populations of insects without the use of chemical insecticides. Various large traps are designed to allow livestock to walk through and remove any insect pests from the livestock and trap them in a screen type trapping element. With these devices the trapping element is only available on the interior of the trap housing and is ineffective for protecting crops or reducing the annoyance to people in outdoor settings. Electric insect trapping and killing devices can provide for a wide range of applications but are hindered by the requirement of being tethered to an electricity source and can become expensive to constantly operate. Mesh fly control traps provide an effective way to control outdoor flies and other insects, but these devices unfortunately require the use of bait that has to be placed inside the trap which requires regular monitoring to maintain effectiveness and are not durable enough to leave in a field or similar area.

While these devices may fulfill their respective, particular objectives, each suffers from one or more of the aforementioned disadvantages. Accordingly, the need exists for a means by which large numbers of flying insects can be destroyed without the aforementioned problems. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to attract, collect, and destroy large numbers of flying insects, particularly biting and blood-feeding flies and thus, the object of the present invention is to solve the aforementioned disadvantages.

To achieve the above objectives, it is an object of the present invention to provide a collapsible fly trap that provides a non-cumbersome means of effectively attracting and capturing various types of flies while providing a portable means of catching a larger number of flies over a larger area. The collapsible fly trap is constructed of materials which are durable and lightweight that provide for easy assembly, transport, and deployment.

Another object of the collapsible fly trap is to provide a device generally comprising a collapsible frame, a textile frame cover, a lure bait ball, a cap, an insect containment space, a plurality of lower leg portions, and a hanging feature and which provides a trapping and containment means for the flies.

Yet still another object of the collapsible fly trap is to provide a frame that is simply deployed in an area where flying insect collection and elimination is desired. The removably attached bait ball provides a luring means to attract the biting insects. The frame cover provides a dark enclosure atop the bait ball having an amount of light shining through a screened upper which attracts the flies to exit the bait ball in an upward direction. The removably attached screen cap sits atop the upper end of the frame cover and provides an insect collecting and containment means between the cap and the screen upper of the frame cover. An aperture in the upper tip of the screen upper of the frame cover provides an exiting means to the insects into the containment space where the insects become trapped and perish over time.

Yet still another object of the collapsible fly trap is to provide a frame comprising four (4) upper leg portions that form a generally cubical support structure and telescopingly receive a lower leg portion. The lower leg portions provide a means to be extended and collapsed within the upper leg portions and are secured via a fastening feature or may be removed from the device depending on the mode of utilization. The frame further comprises four (4) pivotably connected linkages that provide a means to collapse the frame into a compact and portable state.

Yet still another object of the collapsible fly trap is to provide a frame cover comprising four (4) side surfaces, a plurality of sleeves, and a screen portion. The sleeves engage the upper ends of the upper leg portions which provide a means to secure the cover to the frame. The screen provides a pyramid-shaped upper end of the frame cover and comprises an aperture in the tip which provides an access means to the containment space.

Yet still another object of the collapsible fly trap is to provide a cap comprising a generally pyramidal shape which is slightly larger than that of the pyramidal upper end of the cover, square-shaped lip, a screen portion, four (4) flaps, and four (4) sleeves. The sleeves engage the upper ends of the upper leg portions which provide a means to secure the cover to the frame. A flap is located on a bottom edge of the each side of the lip and comprises sealing feature that provides a means of attachment to an outer surface of the cover. The flap can be detached and provides a means of evacuating the containment space as desired by the user.

Yet still another object of the collapsible fly trap is to provide each lower leg portion comprising a foot that provides surface contact area and an anchoring aperture located in the foot that provides a means to secure the device to the ground via a plurality of anchoring stakes.

Yet another object of the collapsible fly trap is to provide a bait ball comprising a collapsible round or oval-shaped body and providing a means of attraction to the flies. The bait ball is baitless, comprising no food or chemical bait, and comprises a dark color which naturally attracts biting insects. The bait ball comprises a center, a ball cover, and a plurality of collapsible concentric rings which provide a means to extend and collapse the bait ball.

Yet another object of the collapsible fly trap is to provide the device comprising a collapsible triangular frame, a triangular textile frame cover, a lure bait ball, a triangular cap, and three (3) lower leg sections and which provides a trapping and containment means for the flies.

Yet still another object of the collapsible fly trap is to provide a method of utilizing the device comprising transporting the device to a desired location, deploying the device, applying the bait ball, collecting and perishing a large number of flying insects, and easily removing the destroyed insects.

Yet still another object of the collapsible fly trap is to provide a method of utilizing the device comprising anchoring the device to the ground in a standing state or hanging from a hanging support such as a tree limb.

Further objects and advantages of the collapsible fly trap will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | collapsible fly trap |
| 20 | frame |
| 22 | upper leg portion |
| 24 | first fastening feature |
| 25 | first connecting feature |
| 26 | linkage |
| 30 | frame cover |
| 31 | side surface |
| 32 | first screen portion |
| 34 | first support member |
| 35 | first sleeve |
| 36 | aperture |
| 37 | loop |
| 38 | first sealing feature |
| 40 | cap |
| 41 | lip |
| 42 | second screen portion |
| 43 | flap |
| 44 | second support member |
| 45 | second sleeve |
| 46 | hanging feature |
| 47 | hinged fastener |
| 48 | second sealing feature |
| 49 | containment space |
| 50 | bait ball |
| 51 | center |
| 52 | ball cover |
| 53 | ring |
| 54 | second connecting feature |
| 56 | suspension segment |
| 58 | third connecting feature |
| 60 | lower leg portion |
| 62 | second fastening feature |
| 64 | foot |
| 66 | anchoring aperture |
| 70 | anchoring stake |
| 80 | hanging segment |
| 90 | hanging support |
| 100 | alternate collapsible fly trap |
| 120 | alternate frame |
| 122 | alternate upper leg portion |
| 124 | alternate first fastening feature |
| 126 | alternate linkage |
| 130 | alternate frame cover |
| 131 | alternate side surface |
| 132 | alternate first screen portion |
| 134 | alternate first support member |
| 135 | alternate first sleeve |
| 136 | alternate aperture |
| 137 | alternate loop |
| 138 | alternate first sealing feature |
| 140 | alternate cap |
| 141 | alternate lip |
| 142 | alternate second screen portion |
| 143 | alternate flap |
| 144 | alternate second support member |
| 145 | alternate second sleeve |
| 148 | second sealing feature |
| 149 | alternate containment space |
| 160 | alternate lower leg portion |
| 162 | alternate second fastening feature |
| 164 | alternate foot |

DETAILED DESCRIPTION OF THE PREFERRED EMBODIMENT

Figure 3:
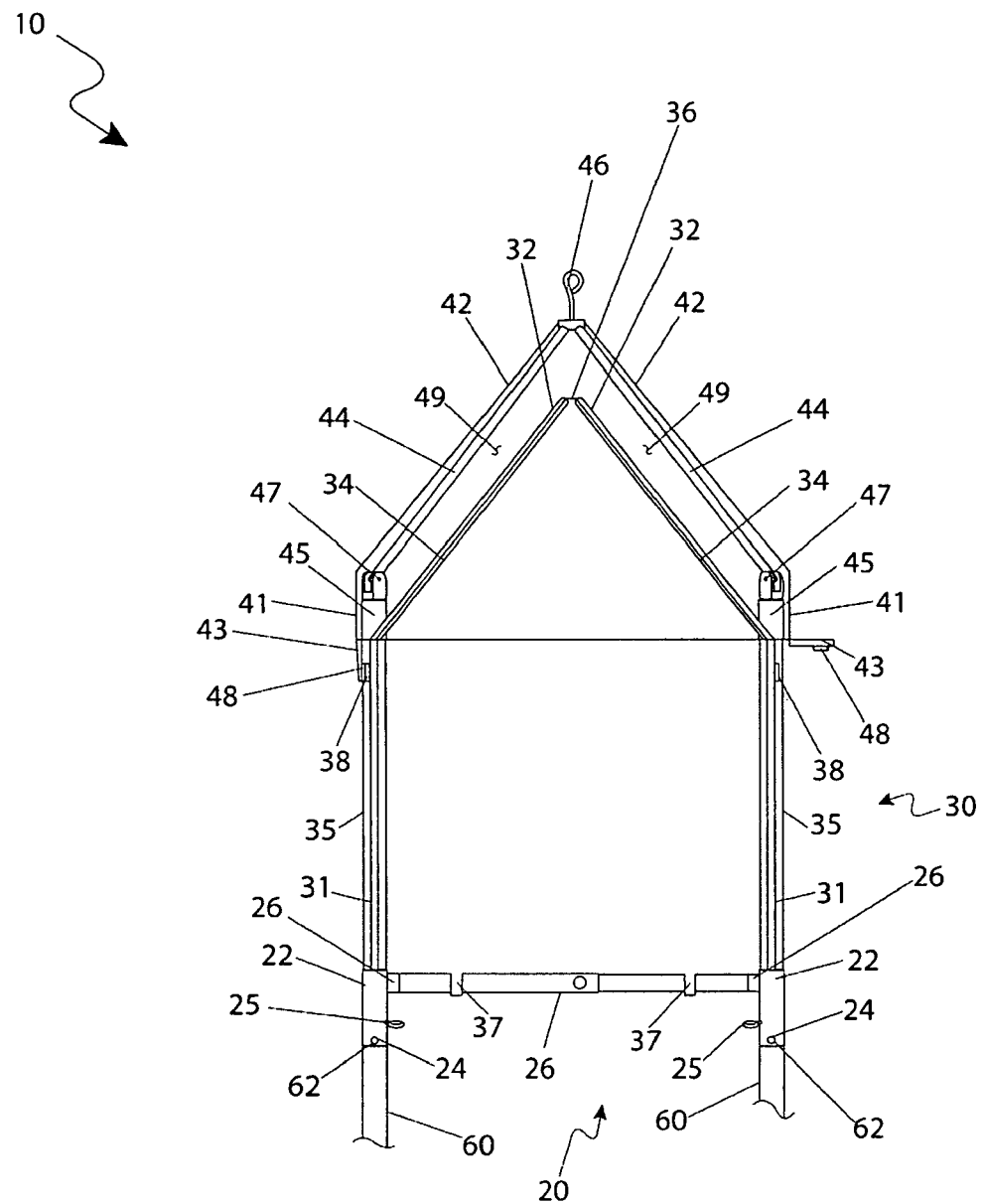
FIG. 3 is section view taken along section line A-A of a collapsible fly trap 10, according to a preferred embodiment of the present invention.
Figure 4:
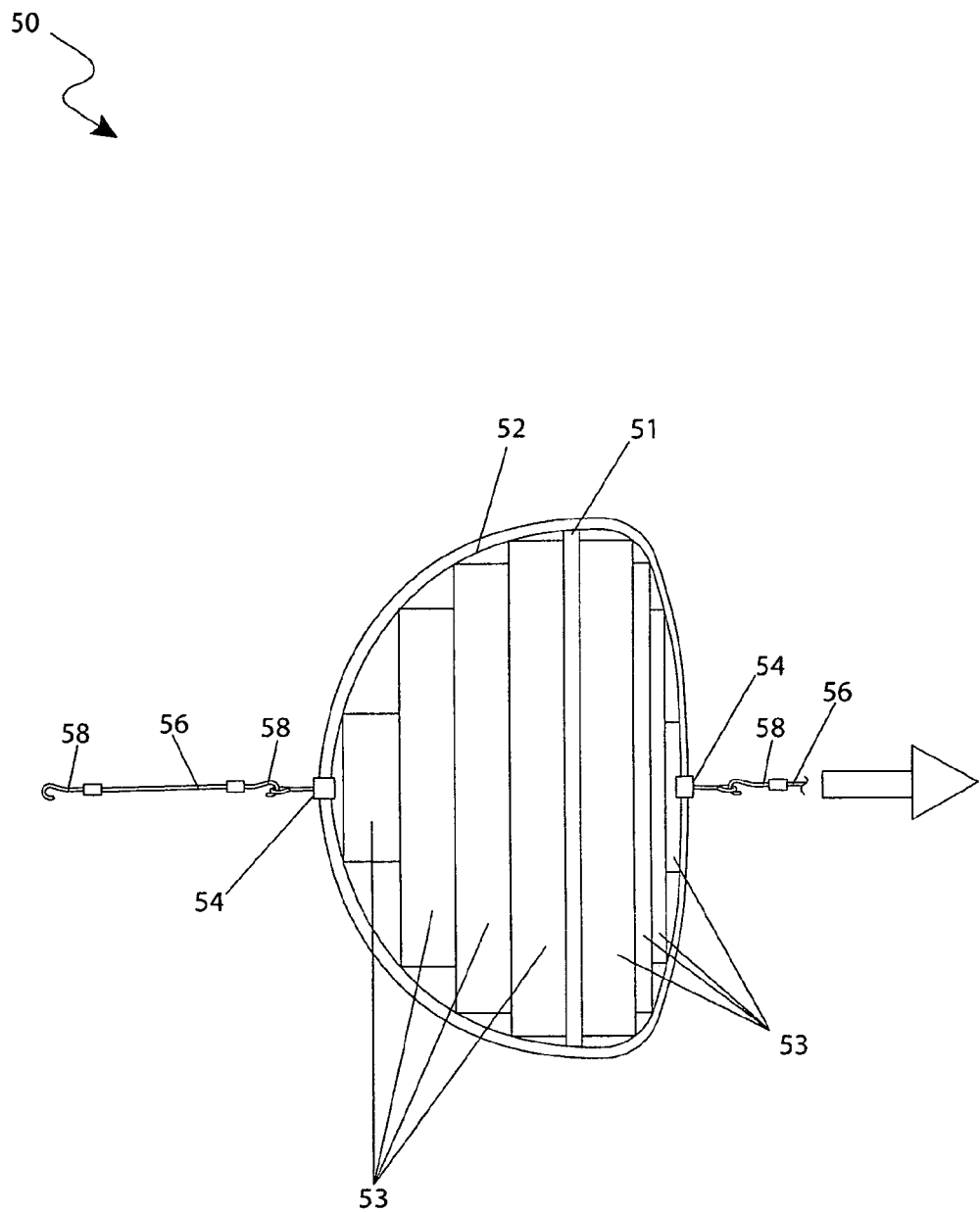
FIG. 4 is a cross section view of a collapsible bait ball 50, according to a preferred embodiment of the present invention.
Figure 5:
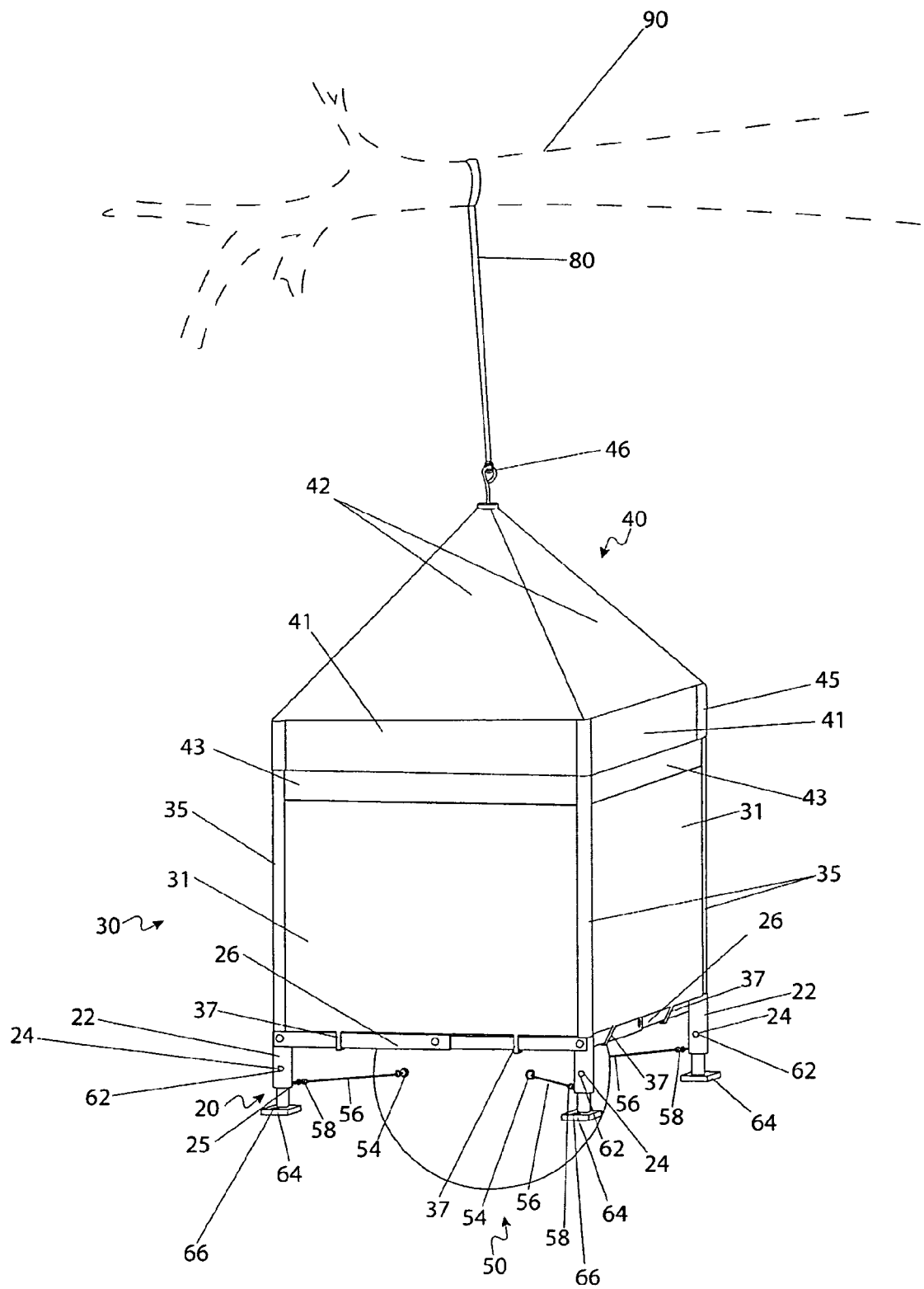
FIG. 5 is a perspective view of a collapsible fly trap 10 depicting an alternate method of utilization, according to a preferred embodiment of the present invention; and, FIG. 6 is a perspective view of an alternate collapsible fly trap 100, according to yet another alternate embodiment of the present invention.
Figure 6:
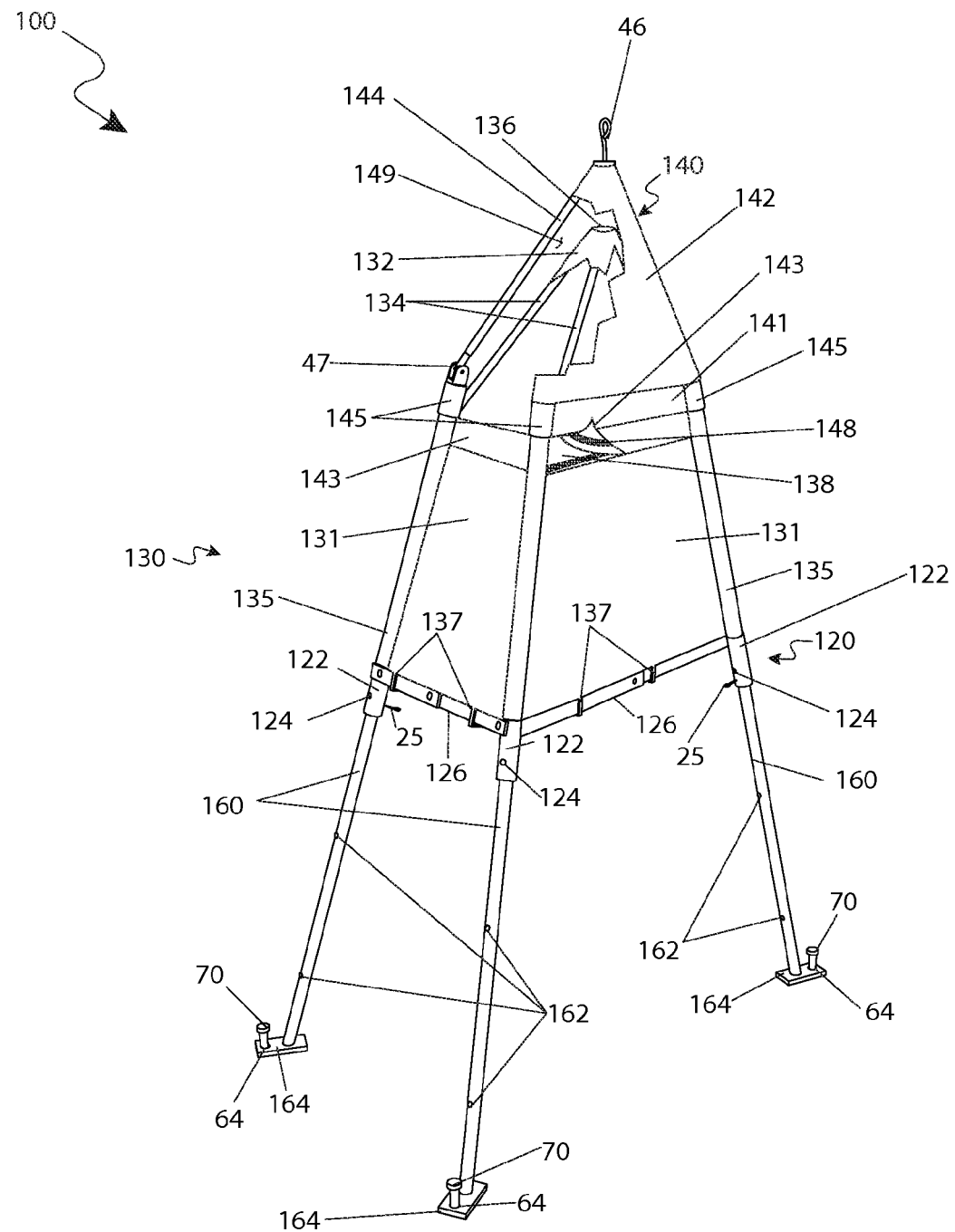

The best mode for carrying out the invention is presented in terms of its preferred embodiment, herein depicted within FIGS. 1 through 4, in an alternate first embodiment within FIG. 5, and in an alternate second embodiment within FIG. 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a collapsible fly trap (herein described as the "device") 10, which provides a non-cumbersome means of effectively attracting and capturing various types of flies. The device 10 serves to provide a portable means of catching a larger number of flies over a larger area than conventional fly traps. The device 10 generally comprises a collapsible frame 20, a textile frame cover 30, a lure bait ball 50 which attracts flies, and a cap 40 which provides a trapping and containment means for the flies.

Figure 1:
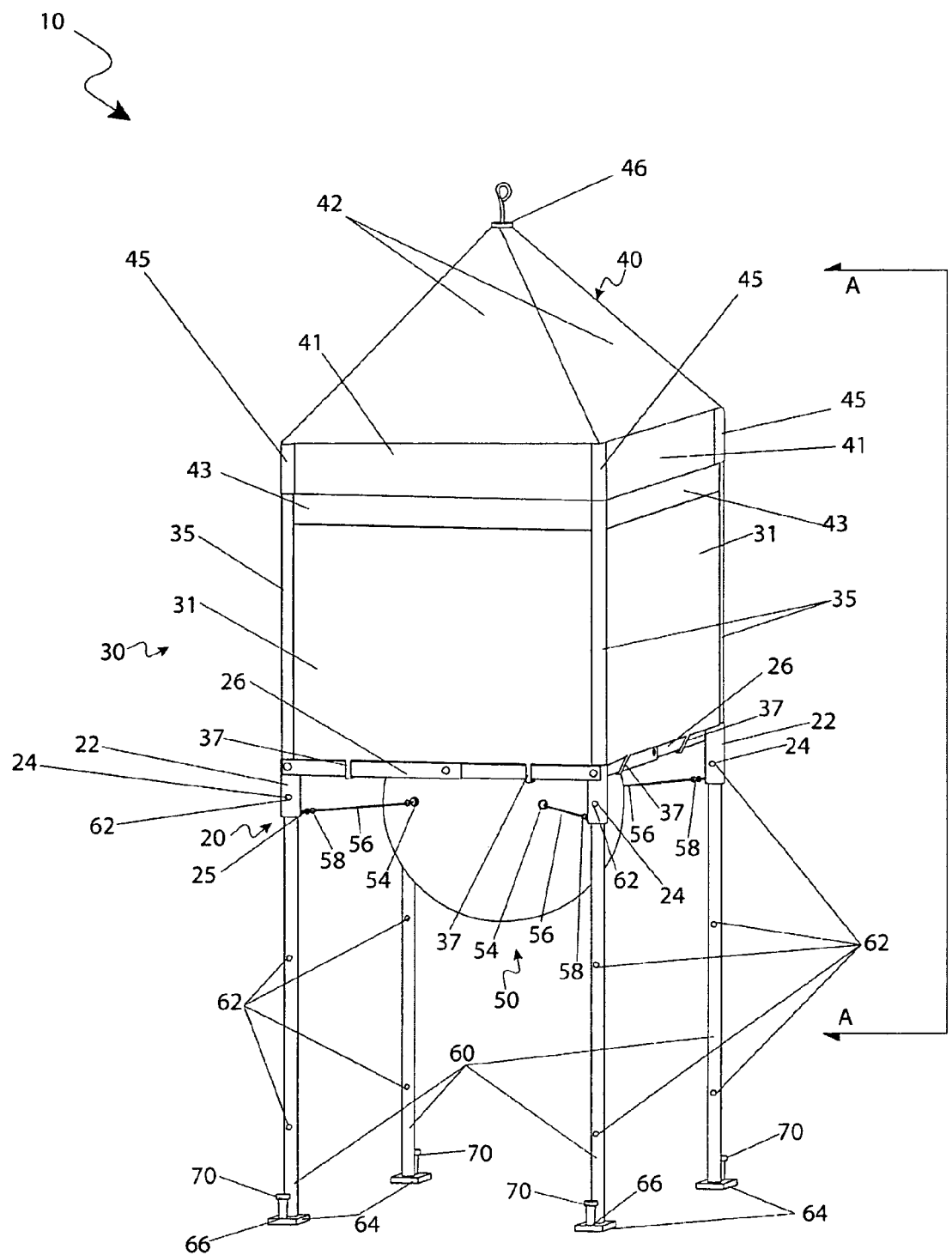
FIG. 1 is a perspective view of a collapsible fly trap 10, according to a preferred embodiment of the present invention.
Figure 2:
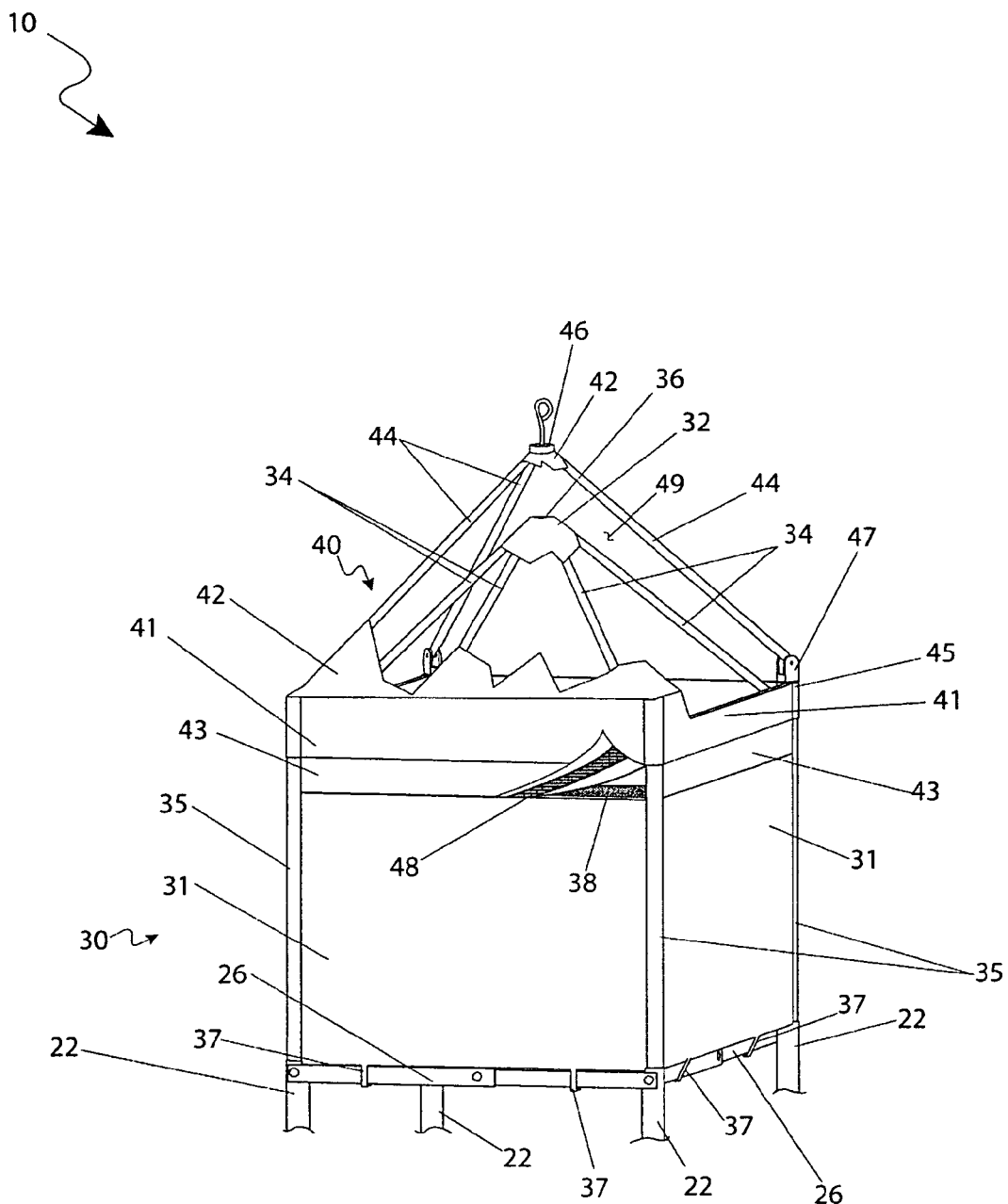
FIG. 2 is a partial cut away view of a collapsible fly trap 10, according to a preferred embodiment of the present invention.

Referring now to FIGS. 1 and 2, a perspective view and a partial cut away view of the device 10, according to the preferred embodiment of the present invention, is disclosed. The device 10 generally comprises a frame 20, a frame cover 30, a cap 40, a bait ball 50, and a plurality of lower leg portions 60. The frame 20 is preferably made of a durable, light-weight weather resistant material, such as plastic, metal, wood, or the like and be fabricated and constructed through common manufacturing techniques. The frame 20 comprises four (4) upper leg portions 22 which form a generally cubical support structure and are preferably segments of circular or square channel. Each upper leg portion 22 is capable of telescopingly receiving an appropriately sized lower leg portion 60 which is also preferably a segment of circular or square channel. The lower leg portion 60 may be extended and collapsed therewithin the upper leg portion 22 during transport and storage or may be removed therefrom the same. A first fastening feature 24 is located thereon a lower end of each upper leg portion 22 and a plurality of second fastening features 62 are located progressively thereon an each lower leg portion 60. When the lower leg portion 60 is telescopingly inserted thereinside a corresponding upper leg portion 22 the fastening features 24, 62 engage, thus locking and securing the now combined leg portions 22, 60 into a desired fixed position and height. Although the fastening features 24, 62 are illustrated here comprising an aperture and a corresponding ball and spring pin fastener respectively, it is understood that the leg portions 22, 60 may be introduced comprising various fastening means, such as pins, clips, screws, or similar captive fasteners and as such should not be interpreted as a limiting factor of the present device 10. The frame 20 further comprises four (4) linkages 26 which provide a means to collapse the frame 20 into a compact and portable state. Each linkage 26 corresponds to the dimension of the frame 20 and is connected on a first end thereto an outer surface of a lower end of an upper leg portion 22 and on a second end thereto an outer surface of a lower end of an opposing upper leg portion 22. The linkage 26 comprises two (2) rigid segments of approximately equal length which are connected via a joint which enables motion therebetween said segments. The linkage 26 is similarly pivotably connected thereto the upper leg portion 22 via a joint. When the frame 20 is in a completely expanded state the linkages 26 and the upper leg portions 22 comprise a generally cuboidal shape and when said frame 20 is in a collapsed state the linkages 26 pivot thereabout the joints, thus enabling the said frame 20 to collapse and said upper leg portions 22 approach one another. The lower leg portion 60 further comprises a foot 64 located thereon a lower end which provides additional surface area and contact stability therewith the ground. Each foot 64 comprises an anchoring aperture 66 through which an anchoring stake 70 may be inserted therethrough which provides additional means of securing the device 10 thereto the ground when in use.

The frame cover 30 comprises four (4) side surfaces 31 and a first screen portion 32 and is preferably made of a durable, weather resistant textile, such as nylon, canvas, plastic coated polyester, or the like. The side portions 31 and the first screen portion 32 of the cover 30 are attached and fabricated via common textile techniques and comprise a sealed seam therebetween. The frame cover 30 slides over top thereof each upper leg portion 22 via four (4) first sleeves 35 forming a generally cuboidal shape defined by the four (4) side surfaces 31 and an open bottom, and may further be fastened thereto the frame 20 via an interference fit, buttons, snaps, clips, or the like. The sleeve 35 comprises a looped portion of the material making up the frame cover 30 and is secured via common textile manufacturing techniques. A top or upper end of the frame cover 30 comprises the four (4) sided pyramid-shaped first screen portion 32. The first screen portion 32 is preferably a durable, fine screen or mesh material which allows light to be transferred therethrough yet provides a smooth surface which entices various biting flies to walk thereon. The first screen portion 32 further comprises a first support member 34 thereon each of the four (4) side edges of said first screen portion 32. The first support member 34 comprises a rigid or semi-rigid rod which is integrated thereinto the first screen portion 32 via durably stitched sleeve or the like such that said first screen portion 32 is free to slide thereover said first support member 34 when the device 10 is collapsed. The first support member 34 reinforces and supports the pyramid shape of the upper end of the cover 30 and is suitably flexible such that the first screen portion 32 may be pushed downward and collapse thereinto an inner area of said cover 30 and the frame 20 for storage and transportation and then easily upwardly extended to an in-use state. Each first support member 34 extends therefrom a base portion of the pyramid shape thereat an upper end of the side surfaces 31 and terminates thereat a truncated apex of the first screen portion 32. This truncated apex of the first screen portion 32 comprises an aperture 36 which is suitably sized to allow various varieties of biting flies to crawl or fly therethrough. The frame cover 30 further comprises a plurality of loops 37 located thereon a lower end of each side surface 31 which loop therearound the linkage 26, thus providing additional security therebetween said frame cover 30 and the frame 20 and maintains a tight fit therebetween the same. The loop 37 may be permanently looped therearound the linkage 37 via being sewn thereto the frame cover 30 or may be removably affixed via a common fastener, such as a snap, hook-and-loop fastener, or the like.

The cap 40 comprises a generally pyramidal shape which is slightly larger than that of the pyramidal upper end of the cover 30. The cap 40 further comprises a square-shaped lip 41, a second screen portion 42, and a flap 43. The second screen portion 42 is similar in material and function to that of the first screen portion 32. The cap 40 slides over top thereof each upper leg portion 22 via four (4) second sleeves 45 forming a generally square shape defined by the four (4) sides of the lip 41 and may further be fastened thereto the frame 20 via an interference fit, buttons, snaps, clips, or the like. The lip 41 comprises the lower base of the cap 40 connected therebetween the second sleeves 45. The cap 40 comprises a flap 43 located thereon a bottom edge of the lip 41 which further comprises a second sealing feature 48. The flap 43 and second sealing feature 48 provide a means of attachment thereto an outer surface of the upper end of the cover 30 thereat a first sealing feature 38. The flap 43 removably attaches thereto the cover 30 via the first and the second sealing features 38, 48 thus providing a closed seal therebetween said cover 30 and said cap 40 such that any flies trapped therebetween will be unable to escape. The closed seal created therebetween the first and the second sealing features 38, 48 comprises a durable hook-and-loop fastener, a zipper, a tongue-and-groove fastener, or the like. When attached thereto the cover 30, the cap 40 provides the trapping mechanism and internal containment space 49 for the entrapped flies. The pyramid shape of the second screen portion 42 is reinforced and supported by four (4) second support members 44 which are similar in material, attachment, and function to that of the first support members 34. The second support member 34 is hingedly affixed thereto an upper end of the upper leg portion 22 via a hinged fastener 47, such as a clevis, a hinge, or the like. The second support member 44 reinforces and supports the pyramid shape of the cap 40 and is suitably flexible such that the second screen portion 42 may collapse for storage and transportation when the frame is collapsed.

The bait ball 50 comprises a collapsible round or oval-shaped body and provides the means of attraction to the flies. The bait ball 50 is baitless, comprising no food or chemical bait for the flies. The bait ball 50 is preferably made of durable weather resistant material such as rubber or the like and comprises a dark color, such as dark blue, black, or the like. The bait ball 50 connects thereto the lower end of two (2) diagonally adjacent upper leg portions 22 thereat a first connecting feature 25. The bait ball 50 is preferably positioned such that a lower portion is exposed and an upper portion is thereinside the open space created by the frame 20 and the cover 30. A suspension segment 56 extends therebetween a first connecting feature 25 and a second connecting feature 54 located thereon opposing ends thereof the bait ball 50. A third connecting feature 58 is located thereon a distal end of the fastening segment 56 which removably attaches thereto the first connecting feature 58. The first connecting feature 25 enables the bait ball 50 to be removably attached thereto the frame 20 via engaging the third connecting feature 58. The first and the third connecting features 25, 58 preferably allow for a secure attachment with a quick and easy release, such as a hook and an eyelet, a plastic clip, or the like. The suspension segment 56 is preferably a cord or wire which comprises an appropriate tensile strength such that the bait ball 50 will be secure even during inclement weather and wind.

Referring now to FIG. 3, a section view take along section line A-A of the device 10, according to the preferred embodiment of the present invention, is disclosed. When in an extended in-use state various types of flies are attracted thereto and land thereon the large, warm dark surface of the bait ball 50 and said flies will naturally move toward the upper portion of said bait ball 50. The first and second screen portions 32, 42 enable light to shine down thereonto the upper surface of the bait ball 50. Flies have a natural tendency to move to the top of an object and fly in a vertical path when leaving an object, thus said flies are guided thereinto an underside of the first screen portion 32 when flying off of the bait ball 50. The flies move toward the light and thus the single avenue of escape therethrough the aperture 36. The aperture 36 is large enough to entice flies to enter, yet small enough to discourage said flies from exiting therethrough the same. The aperture 36 further comprises a smooth undersurface which will not deter said flies from crawling therethrough from underneath and an irregular upper surface therearound the same which will deter said flies from crawling back therethrough. Thus, once the flies emerge therefrom the aperture 36 they are trapped therebetween the cap 40 and the upper portion of the cover 30 therein the containment space 49.

Referring now to FIG. 4, a cross section view of the bait ball 50, according to the preferred embodiment of the present invention, is disclosed. The bait ball 50 comprises a center 51, a ball cover 52, and a plurality of collapsible concentric rings 53. The ball cover 52 is permanently connected thereto an outer perimeter of the center 51 and to an outer edge of each ring 53. The center 51 comprises the central circumference of the bait ball 50. The plurality of rings 53 progressively decrease in diameter such that the bait ball 50 may be extended and collapsed in a similar manner as that of collapsible cones or the like. In a collapsed state the bait ball 50 comprises a relatively compact and flat body which may be deployed via pulling thereon the second connecting features 54 which are integrally attached thereto the ball cover 51 and located adjacent thereto each extendable end of the rings 53. The second connecting feature 54 provides a means of attaching the bait ball 50 thereto the suspension segment 56.

Referring now to FIG. 5, a perspective view of the device 10 depicting an alternate method of utilization, according to the preferred embodiment of the present invention, is now disclosed. The device 10 may be utilized in a hanging state without the lower leg portions 60 or comprising said lower leg portions 60 in a fully retracted state. A hanging feature 46 is located thereon the outside apex of the cap 40 and is preferably an eyelet, a clip, or the like. The hanging feature 46 provides a means by which the device 10 may be secured thereto a hanging support 100, such as a rafter, a tree branch, or the like via a hanging segment 80 which is preferably a length of chain, rope, cable, or the like.

Referring now to FIG. 6, a perspective view of an alternate collapsible fly trap 100, according to an alternate embodiment of the present invention, is now disclosed. The alternate collapsible fly trap 100 is substantially similar in materials, fabrication, and function to that of the device 10 with a particular difference comprising an alternate triangular shape. The alternate collapsible fly trap 100 comprises an alternate frame 120, an alternate frame cover 130, and an alternate cap 140. The alternate frame 120 comprises substantially similar features and function as that of the frame 20 further comprising three (3) alternate linkages 126 and three (3) alternate upper leg portions 122 which are telescopingly connected thereto three (3) alternate lower leg portions 160 via engagement therebetween three (3) alternate first fastening features 124 and three (3) corresponding alternate second fastening features 162. The alternate lower leg portion 160 further comprises an alternate foot 164. The alternate frame cover 130 comprises three (3) alternate side surfaces 131, an open bottom, and three (3) alternate first sleeves 135 which slide thereover the alternate frame 120. The alternate frame cover 130 comprises an alternate first screen portion 132 which comprises the upper portion of the same having an alternate aperture 136 and is reinforced by three (3) alternate first support members 134. An alternate cap 140 comprises an alternate second screen portion 142, an alternate lip 141, and an alternate flap 143 which removably attaches thereto the alternate frame cover 130 via a sealing means therebetween an alternate first sealing feature 138 and an alternate second sealing feature 148 thus creating an alternate containment space 149. The alternate cap 140 further comprises and is reinforced by three (3) alternate second support members 144.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIGS. 1 and 2, alternatively in FIG. 5, and further alternatively as indicated in FIG. 6.

The method of utilizing the device 10 may be achieved by performing the following steps: retrieving said device 10 in a collapsed and stored state; transporting said device 10 thereto a location where an abundance of biting flies have become a nuisance; deploying said device 10 by extending the linkages 26, thus spreading out the frame 20 and frame cover 30; removably inserting or telescopingly extending a lower leg portion 60 to a corresponding upper leg portion 22 and engaging the first and second fastening feature 24, 62 thus locking the same into a desired height and position; driving the anchoring stakes 70 thereinto the ground therethrough the anchoring apertures 66; expanding the bait ball 50 by pulling the suspension segments 56 in opposing directions; removably attaching said bait ball 50 thereto said frame 20 by connecting the third connecting feature 58 thereto the first connecting feature 25; waiting for said biting flies to be attracted thereto said device 10 and trapped thereinside the containment space 49 where the flies die; emptying said containment space 49 by detaching the flap 43 therefrom said frame cover 30, thus breaking the seal therebetween the first sealing feature 38 and the second sealing feature 48; allowing any and all dead flies to fall therefrom the now open containment space 49 and shaking said device 10 to dislodge any fly carcasses if required; collapsing said device 10 for storage or transportation to another location; and, benefiting from the large area and amount of biting flies which are attracted thereto and eliminated by the present device 10.

An alternate method of utilizing the device 10 may be achieved by performing substantially similar steps as previously described with the following additional steps: removing or retracting the lower leg portions 60; fastening the hanging segment 80 thereto the hanging feature 46; attaching said hanging segment 80 thereto a hanging support 90.

The method of utilizing the alternate collapsible fly trap 100 may be achieved by performing the following steps: retrieving said alternate fly trap 100 in a collapsed and stored state; transporting said alternate fly trap 100 thereto a location where an abundance of biting flies have become a nuisance; deploying said alternate fly trap 100 by extending the alternate linkages 126, thus spreading out the alternate frame 120 and alternate frame cover 130; removably inserting or telescopingly extending an alternate lower leg portion 160 to a corresponding alternate upper leg portion 122 and engaging the alternate first and the alternate second fastening features 124, 162 thus locking into a desired height and position; driving the anchoring stakes 70 thereinto the ground therethrough the anchoring apertures 66; expanding the bait ball 50 by pulling the suspension segments 56 in opposing directions; removably attaching said bait ball 50 thereto said alternate frame 120 by connecting the third connecting feature 58 thereto the first connecting feature 25; waiting for said biting flies to be attracted thereto said alternate collapsible fly trap 100 and trapped thereinside the alternate containment space 149 where the flies die; emptying said alternate containment space 149 by detaching the alternate flap 143 therefrom said alternate frame cover 30, thus breaking the seal therebetween the alternate first sealing feature 138 and the alternate second sealing feature 148; allowing any and all dead flies to fall therefrom the now open alternate containment space 149 and shaking said alternate fly trap 100 to dislodge any fly carcasses if required; collapsing said alternate fly trap 100 for storage or transportation to another location; and, benefiting from the large area and amount of biting flies which are attracted thereto and eliminated by the present alternate fly trap 100.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A trap for capturing flying insects, comprising:
    a durable, weather-resistant frame, comprising a support structure with a height adjustment means, and a height securing means;
    a durable, weather-resistant bait removably connected thereto said frame;
    a durable, weather-resistant frame cover removably attachable thereto said frame;
    a durable, weather-resistant cap removably attachable thereto said frame thereabove said frame cover and slightly larger than said frame cover; and,
    a containment space defined therebetween said frame cover and said cap;
    wherein said trap comprises a collapsing means to provide ease in storage and transport;
    wherein said height adjustment means provides a selectable adjustment thereto a desired height;
    wherein said height securing means secures said frame thereat said desired height;
    wherein said collapsing means collapses said frame thereinto a compact state;
    wherein said bait provides an attraction means for said flying insects;
    wherein said frame cover and said cap provides an entrapment means for said flying insects contained therein said containment space; and,
    wherein said bait further comprises a collapsible, generally spherical body further comprising:
        a plurality of first connecting features located at lower positions of said frame;
        a plurality of second connecting features located at an outer surface of said bait; and
        a suspension segment interconnecting each of said plurality of first connecting features to each of said plurality of second connecting features, further comprising a securing durable and resilient suspension means for supporting said bait to said frame; and,
        wherein said bait further comprises a dark coloration, thereby providing said attraction means.

2. The trap of claim 1, wherein said bait further comprises:
    a center comprising a central circumference thereof said bait and having a center diameter;
    a plurality of collapsible concentric rings, comprising progressively decreasing diameters therefrom said center diameter; and,
    a ball cover connected thereto an outer perimeter thereof said center and to an outer edge of each ring thereof said plurality of collapsible concentric rings;
    wherein said plurality of collapsible concentric rings provides a means to expand and collapse said bait during manipulation thereof said plurality of second connecting features.

3. The trap of claim 2, wherein said bait is mounted thereto said frame such that a lower portion is exposed and an upper portion is concealed thereby said frame cover.

4. The trap of claim 1, wherein said frame further comprises:
    four (4) upper leg portions;
    four (4) linkages each pivotally connected on a first end thereto an outer surface of an upper leg portion and at a second end thereto an outer surface of an opposing upper leg portion, and comprising two (2) segments interconnected by a pivot joint; and, four (4) lower leg portions slidingly engaged therein each of said four (4) upper leg portions, each comprising a foot with an anchoring aperture;

wherein said height adjustment means comprises a telescoping adjustment thereof each of said four (4) lower leg portions therein each of said four (4) upper leg portions thereto said desired height; and, wherein said height securement means comprises a fastening means thereof each of said height adjustment means when at said desired height; and, wherein each of said four (4) linkages, when fully extended, provide a cuboidal shape thereto said frame and, when fully retracted, enable said frame to fully collapse.

5. The trap of claim 4, wherein said frame comprises a lightweight and weather-resistant material.

6. The trap of claim 4, wherein said frame cover further comprises:

four (4) side surfaces affixed to each other, thereby forming a cuboidal shape;

four (4) first sleeves vertically oriented along outer corners thereof each of said four (4) side surfaces for enveloping each of said four (4) upper leg portions thereof said frame;

a frame cover attachment means located thereat a bottom periphery of each of said four (4) side surfaces for removably attaching said frame cover thereto said frame; and, a first screen portion attachable thereto an upper periphery edge thereof each of said four (4) side surfaces.

7. The trap of claim 6, wherein said frame cover comprises a weather-proof textile.

8. The trap of claim 6, wherein said frame cover attachment means further comprise a plurality of loops having a removable fastener to attach said frame cover thereto each of said four (4) linkages.

9. The trap of claim 6, wherein said first screen portion comprises a pyramidal shape having a first base portion and a first apex and further comprises:

four (4) first support members, each comprising a flexible and resilient rod integrated thereinto a sleeve therein each of four (4) side edges thereof said first screen portion and extending therefrom said first base portion thereto said first apex; and, an aperture located thereat said first apex comprising a diameter enabling said flying insects to pass therethrough;

wherein each of said four (4) first support members reinforces said first screen portion thereinto said pyramidal shape and allows said first screen portion to slide thereover when collapsed; and, wherein said first screen portion comprises a material enabling light to filter therethrough and a smooth surface providing a difficult means for said flying insects to traverse upon.

10. The trap of claim 4, wherein said cap, further comprises:

a lip comprising a lower portion thereof said cap therein a cuboidal shape;

four (4) second sleeves vertically oriented along outer corners thereof said lip for enveloping each of said four (4) upper leg portions thereof said frame;

a second screen portion attachable thereto an upper periphery edge thereof said lip; and, a flap located thereat a bottom periphery edge thereof said lip, comprising a sealing means therebetween said cap and said frame cover;

wherein said sealing means is adapted to retain entrapped flying insects therein said containment space.

11. The trap of claim 10, wherein said second screen portion comprises a pyramidal shape having a second base portion and a second apex and further comprises:

four (4) second support members, each hingedly affixed thereto an upper end of each of said four (4) upper leg portions and comprising a flexible and resilient rod integrated thereinto a sleeve therein each of four (4) side edges thereof said second screen portion and extending therefrom said second base portion thereto said second apex; and, a hanging feature located thereat said second apex comprising a hanging means therefor to support said trap from a support structure;

wherein each of said four (4) second support rods members reinforces said second screen portion thereinto said pyramidal shape and allows said second screen portion to slide thereover when collapsed; and, wherein said second screen portion comprises a material enabling light to filter therethrough and a smooth surface providing a difficult means for said flying insects to traverse upon.

* * * * *